US008027651B2

(12) United States Patent
Stogner et al.

(10) Patent No.: US 8,027,651 B2
(45) Date of Patent: Sep. 27, 2011

(54) METHOD AND APPARATUS FOR REMOVING DC OFFSET IN A DIRECT CONVERSION RECEIVER

(75) Inventors: Darrell J. Stogner, Plantation, FL (US); Yadunandana N. Rao, Sunrise, FL (US); Charles R. Ruelke, Margate, FL (US); Chet A. Lampert, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 483 days.

(21) Appl. No.: 12/329,034

(22) Filed: Dec. 5, 2008

(65) Prior Publication Data
US 2010/0144303 A1 Jun. 10, 2010

(51) Int. Cl.
*H04B 17/02* (2006.01)
(52) U.S. Cl. ......... 455/134; 455/135; 455/296; 375/319
(58) Field of Classification Search .............. 455/134, 455/135, 296; 375/319
See application file for complete search history.

(56) References Cited

U.S. PATENT DOCUMENTS

| 5,212,826 | A | 5/1993 | Rabe et al. | |
|---|---|---|---|---|
| 5,459,679 | A | 10/1995 | Ziperovich | |
| 6,240,100 | B1 | 5/2001 | Riordan et al. | |
| 6,327,313 | B1 | 12/2001 | Traylor et al. | |
| 6,370,205 | B1 * | 4/2002 | Lindoff et al. | 375/319 |
| 6,449,464 | B1 * | 9/2002 | Ramesh | 455/70 |
| 6,504,884 | B1 * | 1/2003 | Zvonar | 375/346 |
| 6,639,937 | B2 * | 10/2003 | Doetsch et al. | 375/130 |
| 6,717,995 | B2 * | 4/2004 | Zvonar | 375/340 |
| 6,785,338 | B1 * | 8/2004 | Reitmeier et al. | 375/240.29 |
| 7,092,464 | B2 * | 8/2006 | Mills | 375/346 |
| 7,624,008 | B2 * | 11/2009 | Beerends et al. | 704/225 |

OTHER PUBLICATIONS

PCT International Search Report Dated Jul. 6, 2010.
Ben Ayun, et al. "IQCS Algorithm Closing Report", Tetra Technology Group, Jul. 19, 2007.
Lyons, http://www.dspdesignline.com/showArticle.jhtml?articleID=210002082&cid=N, Aug. 11, 2008.

* cited by examiner

*Primary Examiner* — Kenneth B. Wells
(74) *Attorney, Agent, or Firm* — Daniel R. Bestor; Anthony P. Curtis

(57) ABSTRACT

A method and apparatus for correcting direct current (DC) offset errors of a received signal in a direct conversion receiver (DCR) are provided. DC offset correction algorithms are incorporated into the DCR, each algorithm being optimized for a particular receive signal operating environment. The DC offset correction algorithms remove DC offset errors in baseband In-phase and Quadrature-phase signals received within the direct conversion receiver baseband signal path. Individual DC offset correction algorithms are selected for use as determined by a signal quality estimator component. A DC offset correction component of the direct conversion receiver determines an appropriate DC offset correction algorithm suited for a particular operating environment. A criterion for a signal quality estimate is set to control transitioning between DCOC algorithms. A dual threshold strategy may be adopted to transition between one DC offset correction algorithm and another DC offset correction algorithm to provide hysteresis.

20 Claims, 7 Drawing Sheets

METHOD AND APPARATUS FOR REMOVING DC OFFSET IN A DIRECT CONVERSION RECEIVER

TECHNICAL FIELD

This invention relates generally to direct conversion receiver systems, and more specifically to direct current (DC) offset correction of baseband signals in direct conversion receiver systems.

BACKGROUND

For many years, communication systems have employed direct conversion receivers to process received Radio Frequency (RF) signals. RF signals received by a direct conversion receiver are often converted into an in-phase (I) component and a quadrature (Q) component. As is well known in the art, the direct conversion receiver converts the incoming signal to baseband by mixing it with a Local Oscillator (LO) signal having a frequency that is approximately equal to the carrier frequency of the desired on channel signal.

When the received signal is converted into its constituent baseband I/Q components, I/Q mismatch and intrinsic LO self-mixing may introduce a DC offset error. In direct conversion receiver systems, information modulated onto a received RF signal that is equal in frequency to the LO signal is mixed down to DC voltage within the baseband intermediate frequency (IF) signals. This modulated information, in turn, may be corrupted by intrinsic baseband DC offset errors inherent in stages constituent to the analog baseband signal path including the down conversion mixer, post mixer filtering and gain stages. These errors degrade signal quality. For instance, reverse-transmission paths may occur in a direct conversion receiver that may allow LO energy to couple into the mixer's RF input signal path. As a result, the LO energy at the RF input signal path may self-mix with the LO injected into the mixer and create DC offset errors proportional to the LO coupling into the RF path, thereby affecting signal reception. Thus, detection and correction of DC offset errors is important to improved signal reception.

Various approaches have been attempted to try to avoid distortion of modulated information within direct conversion receiver systems. These conventional approaches generally include using transmit modulation schemes that limit the information proximate to the local oscillator signal, compensating the DC offset error while attempting to maintain the desired baseband DC information using a protocol specific algorithm, or filtering out undesired harmonic distortion artifacts after the received signal is demodulated that may have resulted from inadvertent removal of the desired modulated information during compensation of the undesired DC offset errors within IF signals. Many of these conventional approaches however focus on DC offset correction strategies that are optimized to a specific application or protocol. Often though, signal conditions may change in an operating environment. While a single approach to address DC offset errors may achieve acceptable performance under certain conditions, no single DC offset correction strategy can provide optimal performance for all operating conditions encountered in a portable transceiver. Accordingly, there is a need for improved DC offset error correction under changing signal conditions and circuit operating environments.

DETAILED DESCRIPTION

Figure 1:
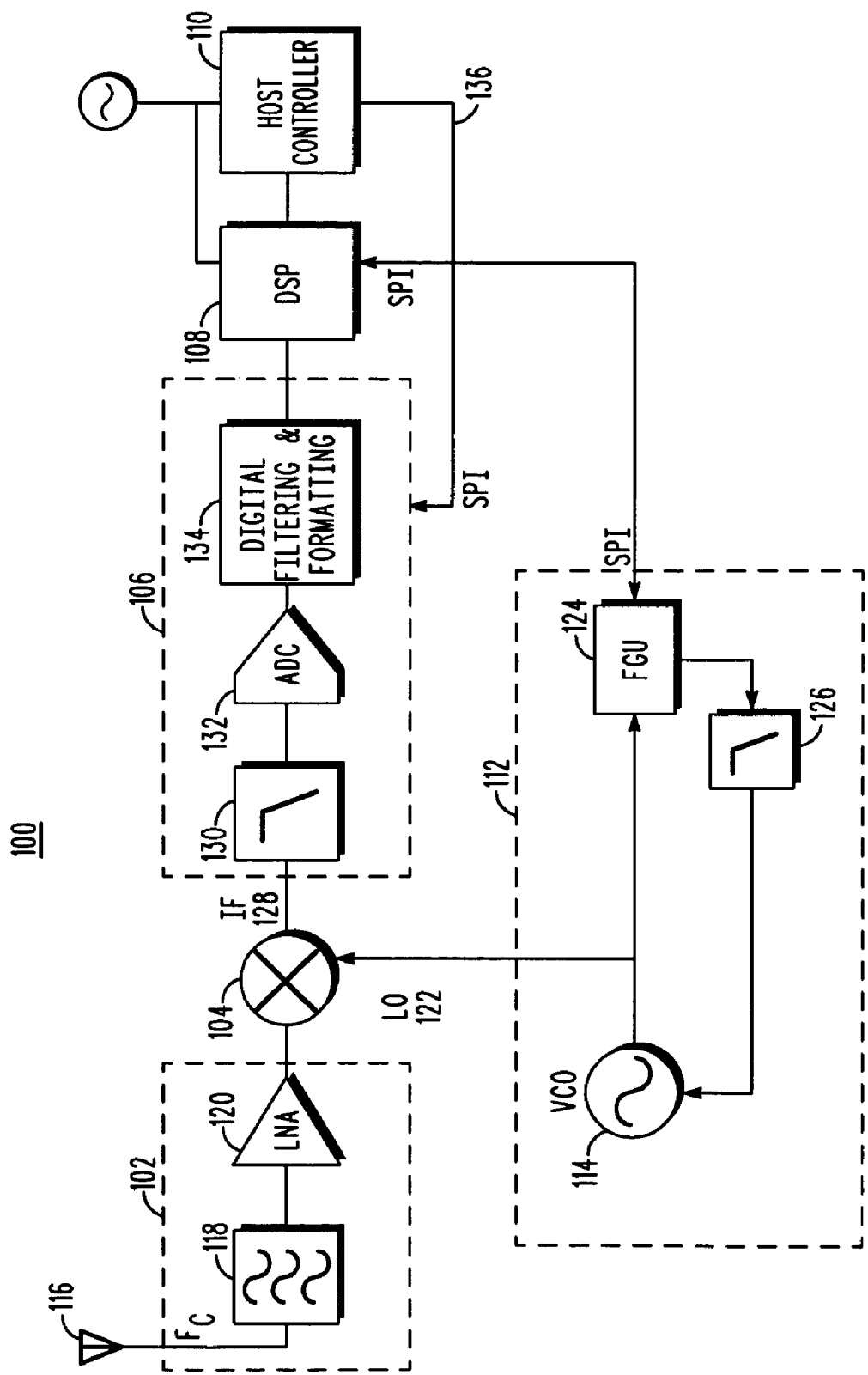
FIG. 1 is a block diagram of an exemplary direct conversion receiver.

While the specification concludes with claims defining features of the invention that are regarded as novel, it is believed that the invention will be better understood from a consideration of the description in conjunction with the drawings. Detailed embodiments are disclosed herein; however, it is to be understood that the disclosed embodiments are merely exemplary, and the invention can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

An apparatus and method are provided for correcting DC offset errors of received signals in a direct conversion receiver. A DC offset correction (DCOC) component of the direct conversion receiver is adapted to select a DCOC algorithm from a plurality of DCOC algorithms as determined by a signal quality estimator component. The DCOC algorithms are configured to remove DC offset errors in baseband in-phase (I) and quadrature-phase (Q) signals received within a baseband signal path of the direct conversion receiver. The DCOC component controls transitioning between the DCOC algorithms and a DCOC OFF state based on set criterion for a signal quality estimate. The signal quality estimator component calculates signal quality estimates for use in selection and activation of a particular DCOC algorithm. DCOC compensation values are calculated with the DCOC algorithms. The DCOC component selects one of the DCOC algorithms using signal quality estimates as an indication of the receive operating environment.

The DCOC algorithms are initialized with an initial seed state and the last DCOC compensation value previously obtained may be used as the initial seed state when transitioning from one DCOC algorithm to another DCOC algorithm. As seen, initially the DCOC component selects an initial DCOC compensation value during a first iteration period and parallel processes received I and Q samples by activating each of the DCOC algorithms. A thresholder of the DCOC component processes the signal quality estimate to select one of the DCOC algorithms. The selected DCOC algorithm determines a DCOC compensation value which is applied to the I and Q signals. Subsequently, another iteration period is triggered and a new DCOC compensation value is calculated using the selected DCOC algorithm. The DCOC component applies the new DCOC compensation value to the I and Q signals and the signal quality estimate is updated to reflect the current operating environment.

An accumulator incorporated in the DCOC component may be used to integrate previous signal quality estimates with current signal quality estimates to produce an average estimate that is forwarded to the thresholder for processing. Based on input from the thresholder the DCOC component determines if the selected DCOC algorithm is to be maintained for continued application or if a different DCOC algorithm is to be activated. In one example embodiment, DCOC algorithm selection may be made between a differentiate-integrate algorithm and a minima-maxima algorithm.

Referring to FIG. 1, an example direct conversion receiver system 100 for processing RF signals is shown. In this example, direct conversion receiver system 100 includes a receiver front end 102, a mixer stage 104, a post mixer filtering and formatting stage 106, a digital signal processor 108, a host controller 110, and a frequency generation system 112 with associated voltage controlled oscillator (VCO) 114. RF signals are received at antenna 116 and processed by receiver front end 102 which incorporates a filter stage 118 and a low noise amplifier (LNA) stage 120. The output signal from receiver front end stage 102 is mainly composed of signals within a desired RF pass band, which is mixed with local oscillator (LO) signal 122. The LO signal 122 is generated using frequency generation system 112, containing frequency generation unit (FGU) 124, loop filter 126 and VCO 114 as is well known in the art.

The mixer stage 104 functions to frequency translate the received information to an intermediate frequency (IF) signal 128 for subsequent processing. The IF signal 128 can correspond to a very low IF (VLIF) frequency or a direct current (DC) baseband signal in which the LO frequency is approximately the same as the desired on channel frequency. When the LO frequency is approximately equal to the desired receive frequency, system 100 is said to operate with direct conversion receiver topology where the baseband DC voltage may contain desired receive information. The IF signal 128 may be subsequently processed by filtering and formatting stage 106 which contains low pass filter 130, analog-to-digital converter (ADC) 132 to digitize the analog receive signal, and digital filtering and formatting component 134. The output signal from filtering and formatting stage 106 may include a number of digital signals representative of the receive signal at receiver antenna 116, which is subsequently processed by digital signal processor (DSP) 108. The DSP 108 recovers the desired information from the digital receive signal. The components of the direct conversion receiver system 100 may be configurable by host controller 110 using serial peripheral interface (SPI) signal 136 as is well known in the art.

Figure 2:
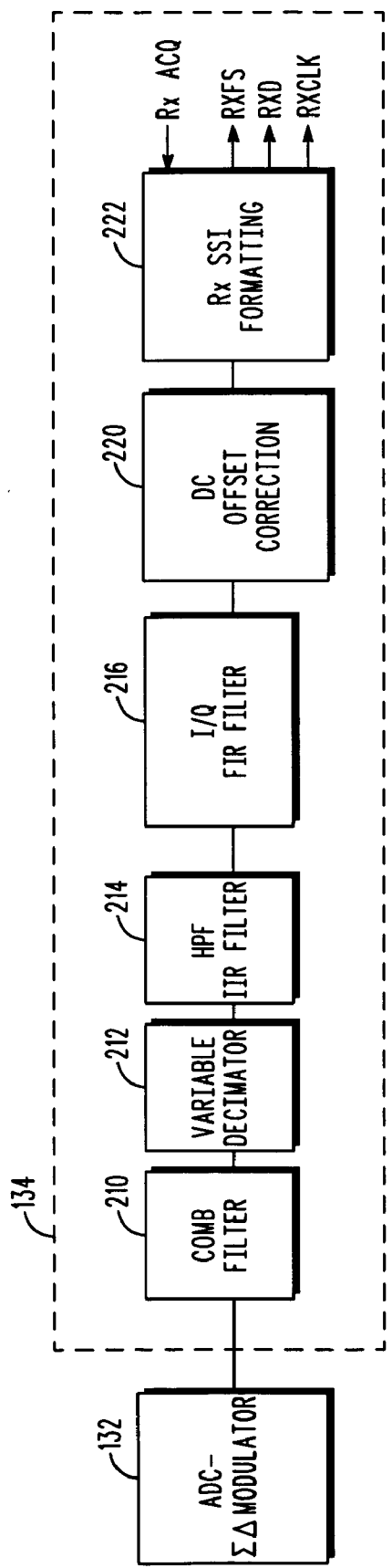
FIG. 2 is a block diagram of an exemplary digital filtering and formatting component of the direct conversion receiver.

A detailed illustration of the ADC component 132 and digital filtering and formatting component 134 are shown in FIG. 2. The ADC 132, for example, may be a Sigma Delta Modulator that converts complex in-phase (I) and quadrature phase (Q) analog input signals into a contiguous stream of samples whose values represent the amplitude and phase information of the analog input signals. Following the ADC 132 is the digital filtering and formatting component 134 containing various subcomponents adapted to post-process the ADC digital samples. The digital filtering and formatting component 134 may include a digital comb filter 210 to minimize aliasing distortion of the incoming samples, a variable decimator 212 to reduce the sample rate to a lower value and an Infinite Impulse Response (IIR) digital filter 214 to remove any DC offset error that may initially be present in the ADC input samples. The digital filtering and formatting component 134 may also contain a complex I/Q Finite Impulse Response (FIR) filter 216 to provide selectivity to undesired off-channel interference signals. A high resolution DC offset correction (DCOC) component 220 is provided and adapted to remove DC offset errors under different operating conditions while not distorting the desired modulated information that may be at DC. The final stage of digital filtering and formatting component 134, in this example, is a Synchronous Serial Interface (SSI) formatting component 280 that configures the input samples into a format that may be communicated and processed by a subsequent digital section such as DSP 108. The SSI output samples may be communicated to the DSP 108 using a receive clock (RXCLK), receive data (RXD), and receive frame sync (RXFS) digital signals that are activated when the DSP 108 asserts a receive acquire (RXACQ) digital line.

In the example direct conversion receiver 100 embodiment shown in FIGS. 1 and 2, the DCOC component 220 performs selection and transition of different DC offset correction algorithms. The DCOC component 220, FIG. 2, can be bypassed and all associated clock signals may be turned off using serial peripheral interface (SPI) commands 136, FIG. 1, from the host processor 110. If enabled, the DCOC component 220 may process I/Q samples continuously in real time for both the I and Q channels independently. The I and Q DC offset correction compensation values can be read back by the host processor 110 using the SPI 136. The DC offset correction compensation values may be automatically applied to the I and Q channels. If an automatic mode is disabled at DCOC component 220, the I/Q DC offset correction compensation value can be directly programmed using SPI 136.

The I/Q DCOC initial start-up time for DCOC component 220 may be synchronized with other processing triggers within the filtering and formatting component 134, FIG. 2. For example, when the FIR filter 216 in the filtering and formatting component 134, has completed its operation, the DCOC component 220 may begin operation. This will avoid processing on transient samples. A logic indicator may be used to suspend processing of samples by the DCOC component 220 until a specific number of samples (time) has passed, after which DCOC component 220 will begin processing input samples from block 216 and apply the appropriate DC offset correction estimate. As illustrated in FIG. 2, the DCOC component 220 may follow the I/Q FIR filter 216 within filtering and formatting component 134. However, the relative position of DCOC component 220 need not be limited in this fashion, but may be located between any given block within filtering and formatting component 134 as may be necessary for accurate compensation of DC offset errors.

Figure 3:
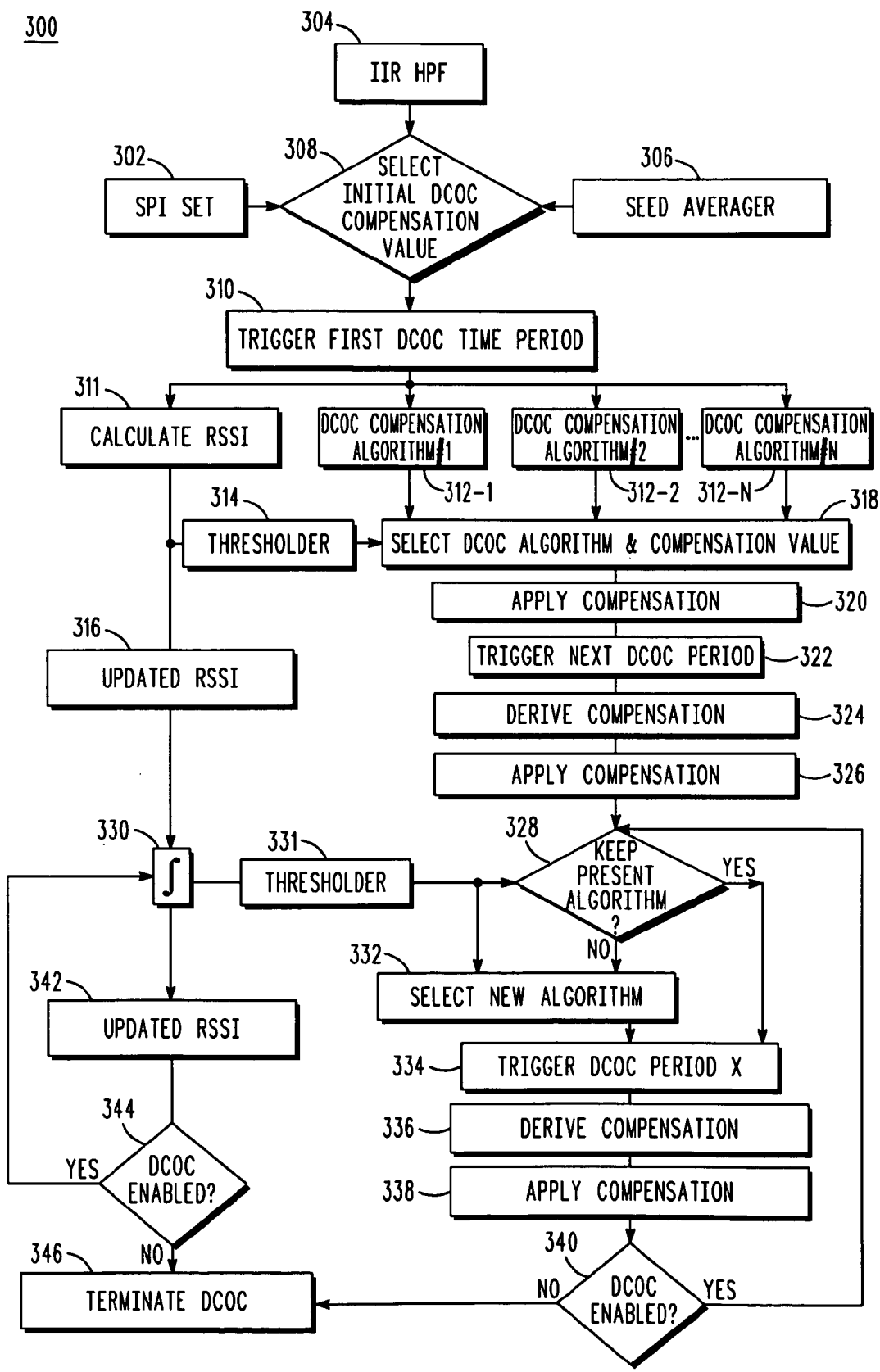
FIG. 3 is a flow chart illustrating an exemplary method for correcting DC offset error through the use of a plurality of DC offset correction algorithms.

FIG. 3 illustrates an exemplary overall DC offset correction state transition diagram that may be embodied in DCOC component 220, FIG. 2. An initial DC offset correction compensation value for state transition diagram 300 may originate from different system sources and may be selectable using SPI programming from the host controller 110. The initial DC offset correction compensation value can be directly set using SPI as indicated in step 302. Alternatively, the initial DCOC compensation value at DCOC start up can be derived from legacy DC offset correction strategies such as through IIR High Pass Filter (HPF) 214 in step 304, or calculated using a mean estimator such as a customized seed averager 306 that may incorporate specialized fast response, variable length arithmetic mean routines. Once the initial DC offset correction compensation source is selected in step 308, the initial DC offset correction compensation value is applied as a beginning value for a first DCOC iteration period which is triggered in step 310.

Once the first DCOC iteration is triggered in step 310, parallel processing of the received I and Q samples begins with executing simultaneous iterations of any number of DCOC algorithms from a plurality of algorithm blocks 312-1, 312-2, through 312-N. Each DCOC algorithm block 312-1, 312-2, through 312-N operates independently on the I and Q channel sample data, with each DCOC algorithm being optimized for a particular receiver operating environment (e.g. signal strength level, attack time, modulation type, or other parametric variations).

The DCOC algorithms within blocks 312-1 through 312-N are initially executed in parallel after initial DCOC trigger block 310 because the receiver operating environment may initially be unknown. Once a signal quality estimate indicative of the operating environment is available, a specific DCOC compensation algorithm corresponding to the particular operating environment may be selected for continued operation. Additionally, signal quality estimates from the signal quality estimator component may be provided to the selected DCOC algorithm to further optimize performance for the current channel conditions. All other algorithms may be disabled to minimize battery power consumption. The signal quality estimator is an algorithmic process component that analyzes a signal to determine signal quality using one or more metrics. For instance, commonly used metrics such as power level, carrier to noise ratio, carrier to interferer ratio, fading channel characteristics and the like for gauging receive signal quality may be employed. The received signal may be an RF passband signal received at an antenna 116, an IF signal 128 or a digitized I and Q sampled signal within digital filtering and formatting block 134. The received signal may be comprised of a desired on-channel carrier, undesired off or on-channel interferers, thermal noise, and/or other sources. The signal quality estimate is generated by the signal quality estimator component and provides an estimate of signal quality.

Simultaneous with the calculations of DCOC compensation values in blocks 312-1 through 312-N, the signal quality estimator calculates a signal quality estimate that may be used in the selection of an optimal DCOC algorithm. In this example, signal quality estimate may be provided by signal quality estimator component 311. The signal quality estimate can be one of, or a combination of, a plurality of metrics, including but not limited to Receive Signal Strength, Bit Error Rate, or Synchronization fidelity as is well known in the art. For example, as seen in FIG. 3, a Received Signal Strength Indicator (RSSI) calculation may be performed by signal quality estimator component 311. However, the signal quality estimator component 311 need not be limited in this fashion. The signal quality estimator component 311 may generate any number of parameters used to select the optimum DCOC algorithm from the plurality of DCOC algorithms embedded in DCOC state transition 300 of DCOC component 220.

The output of signal quality estimator component 311 is connected to thresholder 314. Thresholder 314 processes the signal quality estimate from signal quality estimator component 311 to produce the appropriate code word that may be used to select the optimal DCOC algorithm. In step 318, the code word from thresholder 314 may be used to select the optimum algorithm from the plurality of DCOC algorithms 312-1, 312-2, through 312-N. Step 318 also selects the DCOC compensation value derived from the optimum algorithm block as indicated by the code word from thresholder 314. Once the correct DC offset correction compensation value is selected at block 318, the appropriate compensation value is applied to the data in the I and Q channel independently in step 320 and a subsequent DC offset correction iteration period is triggered in step 322. A new DCOC compensation value is calculated in step 324 using the DCOC algorithm which had previously been selected in step 318. The compensation value derived in step 324 is applied to the I/Q sample stream in step 326.

In parallel to determining a new DCOC compensation value in step 324, the signal quality estimate is updated by signal quality estimator component 316 to reflect the current receive operating environment. For example, as seen in FIG. 3, an updated RSSI calculation may be performed by the signal quality estimator component 316. However, calculation of the signal quality estimate determined by signal quality estimator component 316 need not be limited in this fashion, since signal quality estimator component 316 may generate any number of parameters used to select the optimum DCOC algorithm from the plurality of DCOC algorithms embedded in DCOC state transition methodology 300 of DCOC component 220. The updated RSSI calculated by signal quality estimator component 316 is subsequently forwarded to accumulator 330. Accumulator 330 continuously integrates previous signal quality estimates with current signal quality estimates to produce an average value that can be post-processed by thresholder 331. Thresholder 331 processes the signal quality estimate from accumulator 330 to produce the appropriate code word that may be used to update the active DCOC algorithm. The code word from thresholder 331 may be used in step 328, to determine whether the current DCOC algorithm is optimally suited for the operating environment.

In step 328 of FIG. 3, the DCOC state transition 300 determines whether the active DCOC algorithm should be maintained or selection of a new algorithm is needed based on the input from thresholder 331. If a DCOC algorithm change is required, an input value from thresholder 331 is used in step 332 to select the new DCOC algorithm from the plurality of DCOC algorithms embedded in the DCOC component 220. After a new algorithm is selected that is optimal for the present receive channel operating environment, a new DCOC determination sequence may be triggered at step 334. If no algorithm change is required, the output of decision step 328 bypasses the selection in step 332 to trigger a new DCOC determination period in step 334. After the DC offset correction period is triggered, the active DCOC algorithm calculates the DCOC compensation value in step 336 and subsequently applies the compensation value in step 338. After the DCOC compensation value is applied in step 338, a determination is made in step 340 as to whether the DCOC state transition 300 of DCOC component 220 is enabled. If the DCOC state transition 300 is enabled, the algorithm selection process is repeated back to step 328. If the DCOC state transition 300 of DCOC component 220 is disabled, the state machine suspends processing in step 346.

In parallel to steps 332 through 338, the signal quality estimate is recalculated (e.g. updated RSSI) in signal quality estimator component 342 to indicate the present operating environment of the receive channel. Prior to applying the updated RSSI obtained in signal quality estimator component 342 to thresholder 331, the operating state of DCOC component 220 is determined in step 344 to ensure that continued processing of the DCOC compensation value is needed. If the DCOC state transition 300 of DCOC component 220 is enabled, then decision step 344 will update the accumulator block 330 with a new signal quality estimate obtained from signal quality estimator component 342. Blocks 330, 342 and 344 form a channel environmental metric loop that continuously calculates the signal quality estimate used to select the optimized algorithm selection. Blocks 328, 332, 334, 336, 338 and 340 form a parallel compensation loop that uses the environmental metric loop output to continuously match the DCOC algorithm that is being used to the operating environment. Updates to the signal quality estimate and changes to the DCOC compensation value can be accomplished sample-by-sample, or block-by-block which ever is best suited for the algorithm that is being utilized. Accumulator 330 may also incorporate a number of integration coefficients that allow for a number of system responses, including instantaneous changes in the selection metric or very slow, over damped variations.

As seen, a method of correcting DC offset error of a received signal in a direct conversion receiver is provided. Different DCOC algorithms adapted to remove DC offset errors in a received signal within an I and Q baseband signal are employed at DCOC component 220. Individual DCOC algorithms are selected from a plurality of DCOC compensation algorithms as determined by the signal quality estimator component. Criterion for signal quality estimates are set to control transitioning between various DCOC algorithms and a DC offset correction OFF state. In one particular embodiment, the DCOC component 220 of direct conversion receiver 100 may select and transition between a duality of DCOC algorithms. In particular, a differentiate-integrate algorithm (with quantization noise shaping) and a minima-maxima algorithm may be employed, in this example. The different DCOC algorithms are applied under different operating conditions. In this example, for instance, the differentiate-integrate algorithm may be applied at weaker signal levels and the minima-maxima algorithm may be applied at relatively strong signal levels.

Figure 4:
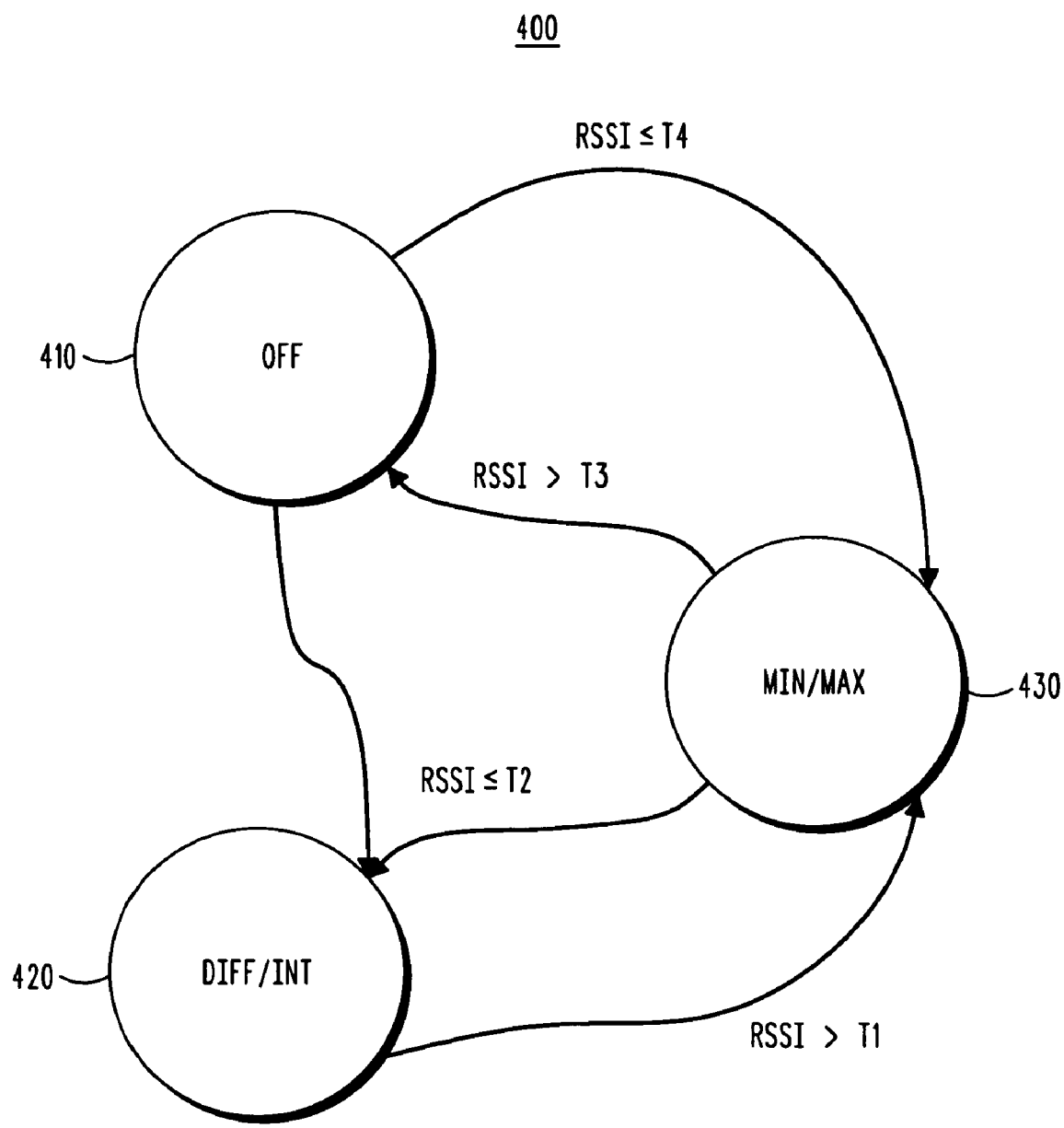
FIG. 4 is an example state machine diagram illustrating DC offset correction algorithm selection.
Figure 5:
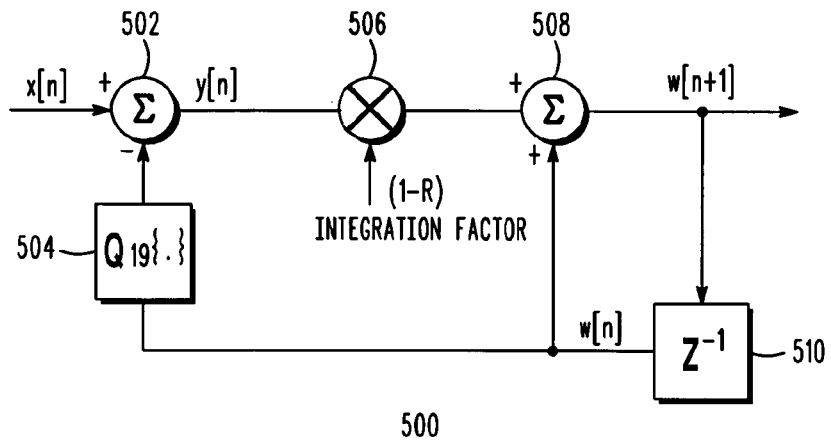
FIG. 5 illustrates an example recursive differentiate-integrate algorithmic block diagram with adaptive noise shaping.
Figure 6:
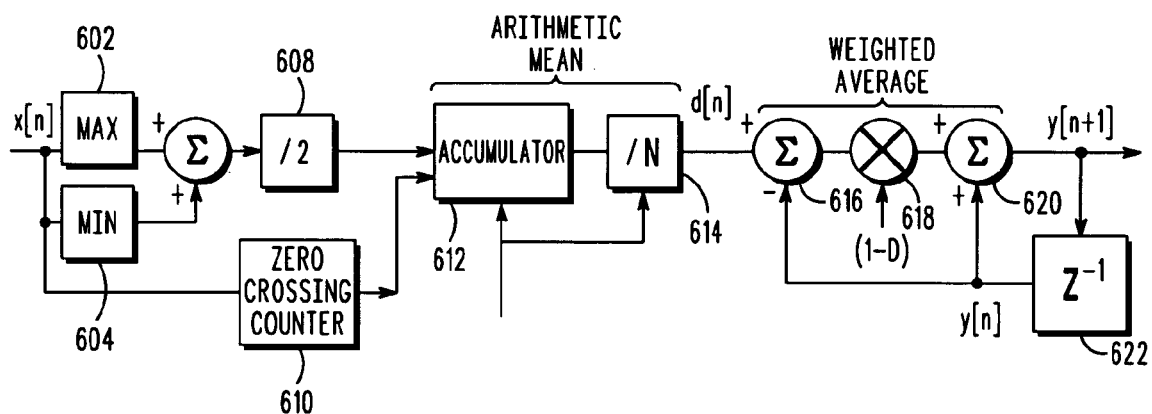
FIG. 6 illustrates an example minima-maxima algorithmic block diagram providing a dual DC averaging technique.

Referring to FIG. 4, an exemplary state machine diagram 400 is shown illustrating an example of transition between a DC offset correction OFF state 410, a differentiate-integrate algorithm 420 and a minima-maxima algorithm 430. In this example, the received signal level is measured using a Received Signal Strength Indicator (RSSI) which may be used to select between the differentiate-integrate algorithm 420 and the minima-maxima algorithm 430. Upon activating the direct conversion receiver system 100, the output signal from the receiver front end stage 102 is measured using one of several methods, as is well known in the art, to determine the on channel carrier power. This RSSI level is compared with a first threshold T2 and if it is lower than the T2 threshold, the differentiate-integrate algorithm 420 is selected. FIG. 5 is a block diagram that illustrates an example differentiate-integrate algorithm. Otherwise, the received signal level is compared with a second threshold T4, and if the RSSI is lower than the T4 threshold, the minima-maxima algorithm 430 is selected. FIG. 6 is a block diagram that illustrates an example minima-maxima algorithm. Otherwise, no DC offset correction is utilized 410.

While the differentiate-integrate algorithm 420 is operational, the on channel received signal strength is compared with a third threshold T1, and if the RSSI is higher than the T1 threshold, the minima-maxima algorithm 430 is selected, with the current DC estimate from the differentiate-integrate algorithm 420 being used to seed an initial starting value for the minima-maxima algorithm 430 to ensure a smooth transition. Otherwise, the differentiate-integrate algorithm 420 continues operating.

While the minima-maxima algorithm 430 is operational, the on channel received signal strength is compared to the first threshold T2, and if the RSSI is lower than the T2 threshold, the differentiate-integrate algorithm 420 is selected (refer to FIG. 5), with the current DC estimate from the minima-maxima algorithm 430 used to seed an initial starting value for the differentiate-integrate algorithm 420 to ensure a smooth transition. Otherwise, the on channel receive signal strength is compared with a fourth threshold T3, and if the RSSI is higher than the T3 threshold, the DC offset correction operation is terminated 410. Otherwise, the minima-maxima algorithm 430 continues operating.

Capturing an accurate initial DC starting value, or seed state, for a DCOC algorithm incorporated into DCOC component 220 is critical to ensuring baseband I and Q signal fidelity. Initialization of the DCOC algorithms is performed to optimize initial DCOC compensation value accuracy and minimize DC transients that may be associated with transitions between algorithms. In this example embodiment, three different initial seed states may be used for initializing the DC offset correction algorithm. These seed states include: 1) setting the initial seed value as determined by a preceding IIR filtering block 304; 2) set initial seed state using a value derived from an initial I/Q DC seed averager 306, FIG. 3; and 3) direct programming of the I/Q DC seed value using the SPI 302. It should be noted that setting the I/Q DC seed state to zero may also be possible, but only if the DC error prior to the DCOC component 220 approaches zero.

When the initial seed averager 306, FIG. 3, of DCOC component 220 is enabled, the seed averager 306 calculates an arithmetic mean for a specified number of samples, where the arithmetic mean is the sum of the input samples divided by the number of samples. The number of initial samples used to determine the initial seed value may be set by SPI 136.

As noted, in one embodiment, two (2) DC offset correction algorithms are incorporated into the DCOC component 220; a differentiate-integrate algorithm and a minima-maxima algorithm. However, DCOC component 220 need not be limited in this fashion, but may incorporate any number of a plurality of DCOC algorithms that are known in the art. In addition, the number of samples processed by an algorithm to determine a DCOC compensation value may vary depending on algorithmic requirements. Algorithmic applicability need not be limited in requiring that all algorithms within DCOC component 220 be equal, or that the DCOC compensation update occur after each block (block by block update) or after each sample (sample by sample update) as is well known in the art. The algorithms may be optimized to provide different advantages at different RF operating environments. For the embodiment illustrated in FIG. 4, the individual algorithms are threshold selectable based on input signal level as measured by RSSI. When the DCOC component 220, FIG. 2, is enabled, a status logic signal may become available to the SSI formatting component 222 to communicate to processing blocks 108 and 110 of FIG. 1 which particular DCOC algorithm is being utilized and the current operating status of the DCOC component 220. A status logic indicator may be used to indicate over SSI signals the DCOC algorithm status on a per sample basis. This information may be used by the DSP 108 or host processor 110 for post processing the input samples.

For the differentiate-integrate algorithm, estimates of the DCOC compensation values for the I and Q channel baseband signals are calculated independently. When the DC offset correction component 220 is enabled and in autonomous mode, the operating state of the DCOC component 220 is defined by the signal quality estimator component 342 of FIG. 3, which may include the received input signal level as indicated in a RSSI metric. If the RSSI is below a set threshold, the differentiate-integrate algorithm may be activated.

One possible embodiment of the differentiate-integrate algorithm is shown in FIG. 5, incorporating a multiplierless implementation that may be optimally efficient for hardware realization. The differentiate-integrate algorithm illustrated in FIG. 5 also includes quantization noise shaping for improved fixed-point finite precision performance.

A differentiate-integrate DCOC compensation value for I and Q may be calculated in this example seen in FIG. 5 as:

$$I_{DC}[n]=I_{DC}[n-1]+(1-R)\cdot(I[n]-Q_{19}\{I_{DC}[n-1]\})$$

and $$Q_{DC}[n]=Q_{DC}[n-1]+(1-R)\cdot(Q[n]-Q_{19}\{Q_{DC}[n-1]\})$$

where $I_{DC}[n]$ and $Q_{DC}[n]$ are the DCOC compensation value estimates for the $n^{th}$ block of S samples for I and Q respectively, denoted by the complex discrete-time signal x[n]. The operation $Q_{19}\{.\}$, means to quantize to 19-bits. Referring to FIG. 5, a 19-bit quantized value of the compensated complex sample w[n] is subtracted from complex input same x[n] at summer 502. The difference quantity y[n] is multiplied by integration scalar (1−R) at block 506 where R is a real value greater than zero but less than 1. The product from multiplier 506 is summed with non-quantized compensated sample w[n] at summer 508 to produce a feed-forward summed output w[n+1]. The output result of summer 508 is delayed by one sample at 510 to produce the dc complex sample w[n] to provide a feed-back path for summer 508. Noise shaping is accomplished by quantizing w[n] at block 504 prior to summation at block 502. It should be obvious to those skilled in the art that interim value y[n] represents the compensated input signal $I[n]-I_{DC}[n]$ and $Q[n]-Q_{DC}[n]$. In this example, the differentiate-integrate sequence runs sample-by-sample with an I and Q channel DCOC error compensation update occurring after a designated number of samples. The number of samples in each block of S samples may be defined in SPI. For example, S may be two hundred, which in turn would define a block of S samples to be 10 mSec integration period assuming a 20 kilo-samples per second (ksps) input sample rate to the DCOC component 220.

The differentiate-integrate algorithm in this example may incorporate a sequence of three time periods, each having its own programmable integration factor R1, R2, and R3. In addition, integration factors R1 and R2 may have an associated number of blocks during which R1 and R2 is applied, designated as duration S1 and S2 respectively. A third iteration period associated with factor R3 may be undefined, as it is assumed to be continuous following the first two periods. In this example, R1 may be applied from 1 to S1 blocks, R2 may be applied from S1+1 to S2 blocks, and R3 may be applied after S2 blocks. However, as will be appreciated by those skilled in the art that the DCOC algorithm need not be limited in this fashion, but may incorporate any number of integration factors and associated integration periods as may be necessary for accurate compensation of DC offset errors.

The integration factors may be partitioned into three ranges R1, R2, and R3, each of which may assume any value necessary to achieve the proper DC offset correction compensation value for a given time period. Range R1 may be a very fast integration period to allow for fast changes for initial DC offset corrections. Range R2 can assume an intermediate value and range R3 can be set to a nominal slow decay integration period to minimize normal system fluctuations that would otherwise reduce DC offset correction compensation accuracy.

The I and Q channel DCOC compensation value in this example, then becomes $$I_{est}[k]=Q_{19}\{I_{DC}[n]\}, Q_{est}[k]=Q_{19}\{Q_{DC}[n]\}$$

The estimate for the $k^{th}$ block comprises taking the last estimate from the previous block and quantizing it to a number of bits, such as 19-bits, for example. The estimate from the previous block of samples is applied to the current block of samples. The estimate is applied by subtracting the estimate from the samples in that block. The differentiate-integrate sequence may run continuously until termination of processing by putting the direct conversion receiver 100, FIG. 1, into battery save, disabling the DCOC component 220, FIG. 2, or exceeding a predefined threshold as illustrated in FIG. 4.

A second approach for determining the I and Q channel DCOC compensation value uses a minima-maxima algorithm. As with the differentiate-integrate algorithm, the DCOC compensation value for the I and Q channels are calculated independently. As seen in FIG. 4, the minima-maxima algorithm is applied when the DCOC component 220 is enabled and the received input signal level is between a pair of configurable thresholds. When the minima-maxima algorithm 600 in FIG. 6 is engaged, the DCOC compensation value may be calculated using a two-level averaging methodology that uses two successive averaging algorithms to determine the DCOC compensation value. The two-level averager may be employed to minimize the DC estimator variance. The two-level averaging strategy initially calculates the I and Q channel DC errors using the minima-maxima algorithm, where the maxima and minima are determined for a given block of S samples at block 602 and 604 respectively. The minima-maxima values are subsequently summed together at block 606 and divided by two (2) at block 608 to produce a DCOC compensation estimate. The DCOC compensation estimate at the output of block 608 can be expressed as:

$$I_{DC} = \frac{\min(I) + \max(I)}{2}$$

$$Q_{DC} = \frac{\min(Q) + \max(Q)}{2}$$

where min(.) and max(.) refer to the maxima and minima of sample values in a given block of S samples, respectively. The size of a block of S samples, in this example, may be the same for both the minima-maxima algorithm and the differentiate-integrate algorithm. However, the block size S need not be limited in this fashion, but may any number of samples as may be necessary for accurate DCOC compensation determination.

Each value of $I_{DC}$ and $Q_{DC}$ from block 608 may also be processed by a modified arithmetic averager composed of accumulator 612 and divider 614. The modified accumulator 612 multiples each input DCOC compensation value from block 608 by a scalar value depending on the input from zero-crossing counter 610. The zero crossing threshold block 610 may be used to ensure that the block of S samples used to calculate the minima-maxima DCOC compensation estimate contains a true minima and maxima value. To accomplish this, the zero-crossing counter 610 sets a minimum threshold of zero crossings that must be present in a given block of S samples to allow the DC estimate from block 608 to be multiplied by a unity scalar within accumulator block 612. If the number of zero crossings detected in block 610 for a given block of S samples is less than the specified threshold, the minima-maxima DCOC compensation estimate from block 608 for that block of S samples may be multiplied by a scalar value less then one, or even zero (completely excluded) within accumulator block 612. If the number of zero crossings is equal to or exceeding the threshold, then the minima-maxima DCOC compensation estimate from block 608 for that block of S samples is multiplied by one which allow the compensation estimate to be fully included in the accumulator summation at block 612. The secondary modified averager system calculates the arithmetic mean of N DCOC compensation estimates $I_{DC}$ and $Q_{DC}$. The secondary averager output can be arithmetically expressed as Arithmetic Mean $\bar{I}_{DC}$ or $$\bar{Q}_{DC} = \frac{\sum_N k_n * x_n}{N}$$

where N=the number of DC estimates,
$k_n$=scalar value for sample block n,
and $x_n$=$I_{DC}$ or $Q_{DC}$ for sample block n
where N is the number of $I_{DC}$ and $Q_{DC}$ estimates that have been accumulated from block 608. The secondary averager may be bypassed if so configured through SPI.

The output of the secondary averager is processed by a weighted average to determine the DCOC compensation value used to adjust the I and Q samples. The weighted average is accomplished in block 616, 618, 620 and 622 as is well known in the art.

The weighted average of the I and Q DC offset value that may be arithmetically expressed as $$\bar{I}_{DC}[n] = \bar{I}_{DC}[n-1] + (1-D) \cdot (I[n] - Q_{19}\{\bar{I}_{DC}[n-1]\})$$

and $$\bar{Q}_{DC}[n] = \bar{Q}_{DC}[n-1] + (1-D) \cdot (Q[n] - Q_{19}\{\bar{Q}_{DC}[n-1]\})$$

where $I_{DC}[n]$ and $Q_{DC}[n]$ are the first averager output for the $n^{th}$ block of S samples for I and Q respectively, and $Q_{19}\{.\}$ in this example means to quantize to 19-bits. In this example, the number of samples used in each block and the block size for the differentiate-integrate and minima-maxima algorithms may be the same, but is not limited in this fashion. The block size for the differentiate-integrate algorithm and minima-maxima algorithm may be different and may be set to any value as may be required to achieve an accurate DCOC compensation value.

The weighted averaging methodology for the minima-maxima algorithm may be the same as previously described for the differentiate-integrate algorithm. The minima-maxima averaging may incorporate a sequence of three time periods, each having its own programmable integration factor D1, D2, and D3, each having an associated number of blocks during which D1 and D2 is applied, designated as duration M1 and M2 respectively. A third iteration period associated with factor D3 is undefined, as it is assumed to be continuous following the first two periods. Therefore, D1 may be applied from 1 to M1 blocks, D2 may be applied from M1+1 to M2 blocks, and D3 may be applied after M2+1 blocks. The number of blocks may be defined in SPI. As noted from the differentiate-integrate discussion, a 20 ksps samples rate at the input of DCOC component 220 and block size of 200 samples will result in an averaging period of 10 mS blocks. It is apparent to those skilled in the art that the averaging period will increase or decrease depending on the block size S, and the secondary averaging period will vary depending on the integration periods M1 and M2. However, as will be appreciated by those skilled in the art that the differentiate-integrate DCOC algorithm need not be limited in this fashion, but may incorporate any number of integration factors and associated integration periods as may be necessary for accurate compensation of DC offset errors.

The I/Q DC estimated compensation then becomes:

$$I_{est}[k] = Q_{19}\{I_{DC}[n]\}, Q_{est}[k] = Q_{19}\{Q_{DC}[n]\}$$

The estimate for the $k^{th}$ block in this example consists of taking the last estimate from the previous block and quantizing it to 19-bits. The estimate from the previous block of samples is applied to the current block of samples. The estimate may be applied by subtracting the estimate from the samples in that block. The application of the estimate is separately enabled from the algorithm using SPI, so that the DC can be calculated but the estimate not applied if desired by the user. The minima-maxima sequence may run continuously until the termination of processing as in the differentiate-integrate algorithm.

The integration factors may be scaled, for example, into three factors D1, D2, and D3, each of which may assume any value necessary to achieve the proper DC offset correction compensation value for a given time period. As with the differentiate-integrate algorithm, factor D1 may be set to produce a fast DC compensation convergence with modest accuracy for integration period M1, factor D2 may be set to produce a slower DC Compensation convergence with an intermediate accuracy for integration period M2, and range D3 may be set to produce the slowest DC compensation convergence with very high accuracy for integration period exceeding period M2. The minima-maxima sequence may run block-by-block with the I/Q DC offset correction update occurring continuously for every block of S samples until the termination of processing.

Figure 7:
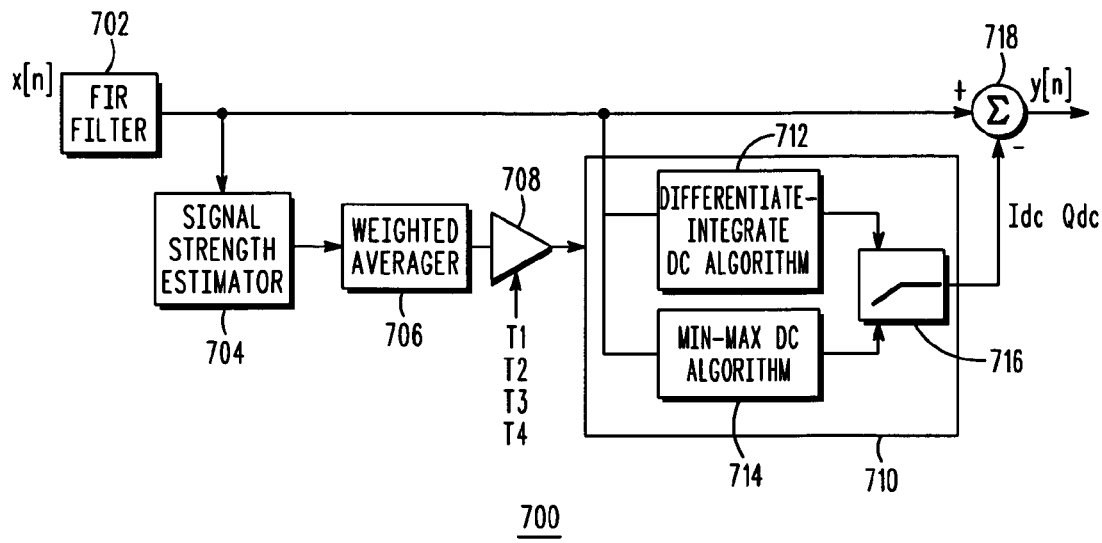
FIG. 7 is a block diagram illustrating one example of DC offset correction threshold setting.

The DC offset correction component 220 incorporates a threshold strategy for DC offset correction. Each of the different DC offset correction algorithms offer certain advantages in different operating environments. The DC offset correction component 220 is configurable to select which DC offset correction algorithm is used based on a set of thresholds. When transitioning from one DC offset correction algorithm to the next, the initial starting point from the new algorithm is seeded using the last value from the old algorithm. For example, switching to the integrate-differentiate algorithm from the minima-maxima algorithm, $I_{est}[0]$ and $Q_{est}[0]$ are seeded with the current minima-maxima estimate. Conversely, when switching to minima-maxima algorithm from the differentiate-integrate algorithm, Iest[0] and Qest[0] are seeded with the current differentiate-integrate estimate. FIG. 7 illustrates an example I/Q DC correction threshold.

In threshold system block diagram 700 illustrated in FIG. 7, FIR filter 702 corresponds to the FIR filter 216 in FIG. 2. The selection of the appropriate DCOC compensation algorithm is accomplished in selector block 710. For this example, selector block 710 incorporates a differentiate-integrate algorithm block 712, minima-maxima algorithm block 714, and selection switch 716. The selection switch 716 selects the algorithm that is to be used to accomplish the DCOC compensation that is applied to summer 718. The algorithm selection at switch 716 is made based on thresholder 708 which incorporates a number of thresholds T1, T2, T3, and T4. Each of the four T1 through T4 corresponds to the four thresholds T1 through T4 as explained with reference to FIG. 4. The input to threshold block 708 is provided by weighted averager 706. The weighted averager block 706 averages the input samples with a weighted averaging factor α as is well known in the art. The averaging block 706 receives an instantaneous receive signal strength (RSS) word (rss[n]) that may be based on a $\sqrt{I^2+Q^2}$ estimate or other level indicators such as Automatic Gain Control (AGC) attenuation settings which is provided by the I/Q signal strength estimator 704. The threshold system 700 may incorporate a weighted average capability to minimize instantaneous variations that may be present in the I and Q channel sampled receive signal. The weighted average computation in block 706 for the DCOC threshold system may be expressed as:

$$mag[n]=\alpha \cdot mag[n-1]+(1-\alpha)*rss[n]$$

where α is the weighting factor, mag[n] and mag[n−1] is the n and (n−1) samples output from block 706 and rss[n] is the instantaneous receive signal strength word from block 704.

For simplicity, only one path is illustrated in threshold system diagram 700; however, the I and Q samples may be independently compensated using parallel compensation systems, where an individual compensation system is represent in FIG. 7. In FIG. 7, complex time domain I/Q samples x[n] are filtered through the FIR filter 702 based on the filter configuration to generate the signal s[n]. The DC offset correction is then applied to the post-FIR filtered I/Q samples at summer 718 to produce DCOC compensated sample y[n]=s[n]−$I_{DC}/Q_{DC}$. The transitions between DCOC algorithms is bounded by two (2) thresholds, in this example, to provide hysteresis for mitigating uncontrolled toggling between operating states. An example of threshold transitions for differentiate-integrate and minima-maxima algorithms are set forth below in Table 1.

TABLE 1

| PAST Algorithm | NEW Algorithm | Threshold |
| --- | --- | --- |
| Diff-Int | max-min | T1 |
| Max-min | Diff-Int | T2 |
| Max-min | Strong signal OFF | T3 |
| Strong signal OFF | Max-min | T4 |

Figure 8:
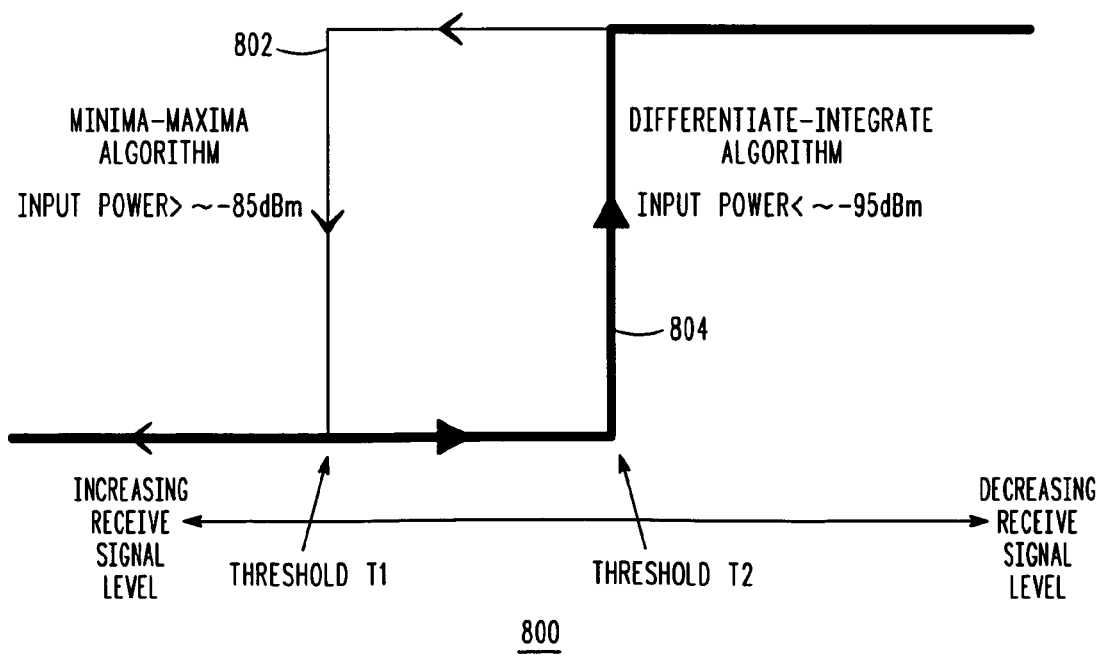
FIG. 8 illustrates an example transition between a differentiate-integrate algorithm to a minima-maxima algorithm for a DC correction weak signal threshold.

The thresholds defined in Table 1 may be one's compliment linear representation of the I or Q signal level. FIG. 8 illustrates an example transition response diagram between differentiate-integrate to minima-maxima DC offset correction algorithms. As seen in FIG. 8, two thresholds T1 and T2 are implemented to allow hysteresis to be incorporated into the DCOC algorithm transitions. Hysteresis may be advantageous to prevent uncontrolled "toggling" between algorithms should the RSS become proximate with a particular threshold. As is well known in the art, real time variations of the received signal strength (RSS) are frequently encountered in RF receivers due to fading, multi-path phasing, or movement of surrounding objects such as vehicles. Referring to threshold response diagram 800, when the RSS is continuously below threshold T2, the DCOC compensation is calculated using the differentiate-integrate algorithm. If the RSS is continuously above threshold T1, the DCOC compensation is calculated using the minima-maxima algorithm. However, if changes in RSS cross threshold T1 with the changes varying from weak signal to strong signal operating conditions as illustrated in response 802 of FIG. 8, the DCOC compensation algorithm will change from differentiate-integrate to minima-maxima algorithm. In like manner if changes in RSS cross threshold T2 with said changes varying from strong signal to weak signal operating conditions as illustrated in response 804 of FIG. 8, the DCOC compensation algorithm will change from the minima-maxima to the differentiate-integrate algorithm. Thresholds T1 and T2 need not be equal; however, because more accurate DCOC compensation values may be realized using the differentiate-integrate algorithm for weak RSS conditions, threshold T2 must be less than threshold T1 for proper operation. As illustrated in the example in FIG. 8, threshold T1 may selectively correspond to an RSS of −85 dBmm and threshold T2 may selectively correspond to a RSS of −95 dBm. These settings for T1 and T2, in this example, will provide for 10 dB of hysteresis in the DCOC algorithm transition.

Figure 9:
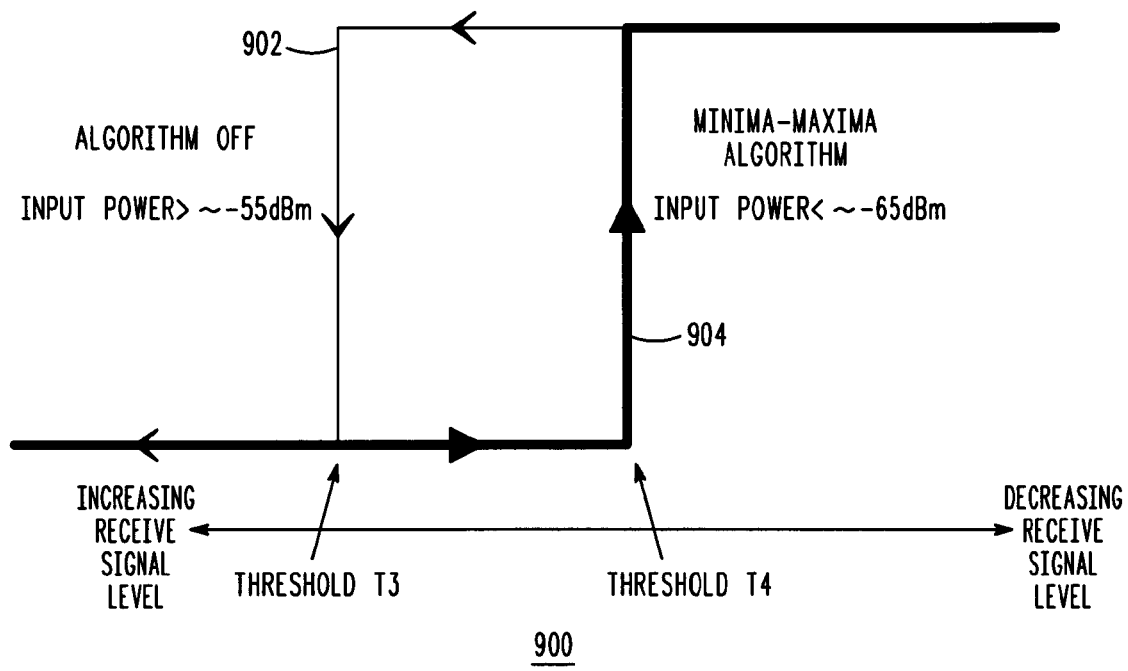
FIG. 9 illustrates an example transition between a minima-maxima algorithm to an OFF state for a DC correction strong signal threshold.

FIG. 9 illustrates an example transition response diagram between minima-maxima DC offset correction algorithms to an DCOC OFF (or suspend) state. It is anticipated that the thresholds illustrated in FIG. 9 are higher than those shown in FIG. 8, and may be independently controlled based on algorithm and receive environmental indicator metrics. As seen in FIG. 9, two thresholds T3 and T4 are implemented to allow hysteresis to be incorporated into the DCOC algorithm transitions. When the RSS is continuously below threshold T4, the DCOC compensation is calculated using the minima-maxima algorithm. If the RSS is continuously above threshold T3, the DCOC compensation is calculated may be disabled or turned off. Turning off the DCOC compensation algorithm under very high RSS operating environments may be advantageous since DC offset errors are not as detrimental to receive signal fidelity under very strong signal conditions, and turning off the DCOC algorithm may reduce battery power consumption. However, if changes in RSS cross threshold T3 with the changes varying from weaker signal to stronger signal operating conditions as illustrated in response 902 of FIG. 9, the DCOC compensation algorithm will change from minima-maxima algorithm to an OFF state. In like manner if changes in RSS cross threshold T4 with the changes varying from stronger signal to weaker signal operating conditions as illustrated in response 904 of FIG. 9, the DCOC compensation algorithm will change from an OFF state to a minima-maxima algorithm. Thresholds T3 and T4 need not be equal; however, because more accurate DCOC compensation values may be realized using the minima-maxima algorithm for weaker RSS conditions, threshold T4 must less than Threshold T3 for proper operation. As illustrated in the example of FIG. 9, threshold T3 may selectively correspond to an RSS of −55 dBmm and threshold T4 may selectively correspond to a RSS of −65 dBm. These settings for T3 and T2, in this example, provide for 10 dB of hysteresis in the DCOC algorithm transition between the minima-maxima DCOC algorithm and the OFF-state.

It will be appreciated that some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For instance, as seen, a DC offset correction compensation estimate is calculated but may not necessarily be applied if desired. Calculation and application of DC offset correction compensation are separate actions and the DC offset correction component may calculate the DC offset correction but selectively may not apply the correction value for various reasons (e.g. transients, muting the receive audio or other reasons).

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regard in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for correcting direct current (DC) offset error of a received signal in a direct conversion receiver, the method comprising:
providing a plurality of DC offset correction (DCOC) algorithms, the DCOC algorithms being adapted to remove DC offset errors in baseband in-phase (I) and quadrature-phase (Q) signals received within a baseband signal path of the direct conversion receiver;
selecting individual DCOC algorithms from the plurality of DCOC algorithms as determined by a signal quality estimator component; and
setting a criterion for a signal quality estimate to control transitioning between the plurality of DCOC algorithms.

2. The method of claim 1 further comprising calculating the signal quality estimate for use in selection of a particular DCOC algorithm from the plurality of DCOC algorithms and calculating DCOC compensation values with the plurality of DCOC algorithms.

3. The method of claim 1 further comprising setting a criterion for transitioning between at least one DCOC algorithm and a DCOC OFF state.

4. The method of claim 1 further comprising:
selecting an initial DCOC compensation value;
using the initial DCOC compensation value as a beginning value during a first DCOC iteration period; and
processing received I and Q samples by activating the plurality of DCOC algorithms.

5. The method of claim 4 further comprising selecting one DCOC algorithm from the plurality of DCOC algorithms using the signal quality estimate for an indication of an operating environment.

6. The method of claim 4 further comprising:
processing the signal quality estimate with a thresholder to select one algorithm from the plurality of DCOC algorithms;
obtaining a DCOC compensation value derived from the selected DCOC algorithm indicated by the thresholder; and
applying the DCOC compensation value to the I and Q signals.

7. The method of claim 6 further comprising:
triggering another iteration period;
calculating a new DCOC compensation value after triggering the other iteration period using the selected DCOC algorithm;
applying the new DCOC compensation value to the I and Q signals; and
updating the signal quality estimate to reflect a current operating environment.

8. The method of claim 7 further comprising:
forwarding the updated signal quality estimate to an accumulator, the accumulator adapted to integrate previous signal quality estimates with current signal quality estimates to produce an average estimate;
forwarding the average estimate to the thresholder for processing; and
determining if the selected DCOC algorithm is to be maintained or if a different DCOC algorithm is to be activated based on input from the thresholder.

9. The method of claim 1 wherein said selecting individual DCOC algorithms further comprises selecting between at least 1) a differentiate-integrate algorithm and 2) a minima-maxima algorithm.

10. The method of claim 9 wherein the signal quality estimator component employs a Received Signal Strength Indicator (RSSI) algorithm.

11. The method of claim 9 further comprising implementing thresholds to bound transitions between DCOC algorithms such that hysterisis is provided when transitioning from one DCOC algorithm to another DCOC algorithm.

12. The method of claim 9 wherein the differentiate-integrate algorithm is selected and activated if the signal quality estimate is below a set threshold.

13. The method of claim 9 wherein the minima-maxima algorithm is selected and activated if the signal quality estimate is between a set of configurable thresholds and wherein the minima-maxima algorithm employs a two-level averaging methodology to determine DCOC compensation value.

14. The method of claim 9 wherein a DCOC compensation value is multiplied by a scalar number having a value ranging from zero to one based on a value of a zero crossing count for a sample block corresponding to the DCOC compensation value.

15. The method of claim 1 further comprising obtaining an initial seed state and initializing the DCOC algorithms with the initial seed state.

16. The method of claim 15 wherein the initial seed state is selectively obtained from at least one of: a) a serial peripheral interface (SPI) and b) a mean estimator.

17. The method of claim 15 further comprising using a last previous DCOC compensation value as the initial seed state when transitioning from one DCOC algorithm to another DCOC algorithm.

18. The method of claim 1 further comprising implementing thresholds to bound transitions between DCOC algorithms such that hysterisis is provided when transitioning from one DCOC algorithm to another DCOC algorithm.

19. The method of claim 1 further comprising optimizing each of the plurality of DCOC algorithms for a particular operating environment.

20. An apparatus for correcting direct current (DC) offset error of a received signal in a direct conversion receiver comprising a DC offset correction (DCOC) component adapted to select individual DCOC algorithms from a plurality of DCOC algorithms as determined by a signal quality estimator component, the DCOC algorithms being adapted to remove DC offset errors in baseband in-phase (I) and quadrature-phase (Q) signals received within a baseband signal path of the direct conversion receiver, wherein the DCOC component is adapted to control transitioning between the plurality of DCOC algorithms based on a set criterion for a signal quality estimate.

\* \* \* \* \*